(12) United States Patent
Breton

(10) Patent No.: US 7,108,370 B2
(45) Date of Patent: Sep. 19, 2006

(54) HAND HELD PRINTING OF TEXT AND IMAGES FOR PREVENTING SKEW AND CUTTING OF PRINTED IMAGES

(75) Inventor: Alex Breton, Enskede Gård (SE)

(73) Assignee: Xpandium AB, Stockholm (SE)

( * ) Notice: Subject to any disclaimer, the term of this patent is extended or adjusted under 35 U.S.C. 154(b) by 0 days.

(21) Appl. No.: 10/507,487

(22) PCT Filed: Mar. 10, 2003

(86) PCT No.: PCT/SE03/00391

§ 371 (c)(1),
(2), (4) Date: Sep. 8, 2005

(87) PCT Pub. No.: WO03/076198

PCT Pub. Date: Sep. 18, 2003

(65) Prior Publication Data

US 2006/0061647 A1    Mar. 23, 2006

(30) Foreign Application Priority Data

Mar. 11, 2002 (SE) .................................... 0200709

(51) Int. Cl.
*B41J 2/175* (2006.01)

(52) U.S. Cl. ......................................... 347/109; 400/88
(58) Field of Classification Search .................. 400/88; 347/109
See application file for complete search history.

(56) References Cited

U.S. PATENT DOCUMENTS

| 4,901,164 | A | * | 2/1990 | Kurosawa ................... 358/473 |
| 5,644,139 | A | | 7/1997 | Allen et al. |
| 5,852,434 | A | | 12/1998 | Sekendur |
| 5,927,872 | A | | 7/1999 | Yamada |
| 6,233,368 | B1 | | 5/2001 | Badyal et al. |
| 6,357,939 | B1 | | 3/2002 | Baron |

FOREIGN PATENT DOCUMENTS

| DE | 19947427 A1 | 4/2001 |
| EP | 730366 A2 * | 9/1996 |
| WO | 0174598 A1 | 10/2001 |

* cited by examiner

*Primary Examiner*—Stephen Meier
*Assistant Examiner*—Ly T. Tran
(74) *Attorney, Agent, or Firm*—Nixon & Vanderhye (57) ABSTRACT

The invention relates to a sensor and assembly comprised in a housing for a hand-held and hand-operated printing device controlled by a processor, and a method therefor. It provides that the assembly comprises an arrangement and a method for preventing skew and cutting of printed images.

23 Claims, 7 Drawing Sheets

HAND HELD PRINTING OF TEXT AND IMAGES FOR PREVENTING SKEW AND CUTTING OF PRINTED IMAGES

This application is a US national phase of international application PCT/SE03/00391 filed in English on 10 Mar. 2003, which designated the US. PCT/SE03/00391 claims priority to SE Application No. 0200709-4 filed 11 Mar. 2002. The entire contents of these applications are incorporated herein by reference.

TECHNICAL FIELD

The present invention pertains to a sensor means and a print-head assembly for a hand-held and hand-operated printing on a print medium controlled by a processor, and a method therefore, so called Random Movement Printing Technology (RMPT). Specifically it provides an arrangement and a method to prevent cutting of printed text or other images in consecutive printing bands/lines.

BACKGROUND ART

Hand-held and hand-operated printing devices with an ink-jet print-head are known through various documents.

U.S. Pat. No. 5,927,872 to Yamada discloses a system and a method of printing an image represented by a frame of image data utilizing a hand-held printer having optical sensor means for tracking positions of the hand-held printer relative to the surface of a print medium during a printing process. It is monitored in real time using navigation information generated by the optical sensor.

Each optical sensor comprises an array of opto-electronic elements to capture images of the surface of a print medium at fixed time intervals. Preferably, the optical sensor means can detect slight pattern variations on the print medium, such as paper fibers or illumination pattern formed by highly reflective surface features and shadowed areas between raised surface features. These features can then be used as references for determining the position and the relative movement of the hand-held printer. During the printing process, the printed portions of the image can also be used as reference positions by the hand-held printer.

In the preferred embodiment, the hand-held printer contains a navigation processor and a printer driver. Using the printer driver, the navigation processor drives the hand-held printer to print segments of the image onto a print medium as the hand-held printer travels across the print medium during a printing process. Each segment of the image is printed onto a particular location on the print medium to form a composite of the image.

In the U.S. Pat. No. 6,233,368 B1 to Badyal et al it is taught a CMOS digital integrated circuit (IC) chip on which an image is captured, digitized, and then processed on-chip in substantially the digital domain.

A preferred embodiment comprises imaging circuitry including a photo cell array for capturing an image and generating a representative analog signal, conversion circuitry including an n-bit successive approximation register (SAR) analog-to-digital convertor for converting the analog signal to a corresponding digital signal, filter circuitry including a spatial filter for edge and contrast enhancement of the corresponding image, compression circuitry for reducing the digital signal storage needs, correlation circuitry for processing the digital signal to generate a result surface on which a minima resides representing a best fit image displacement between the captured image and previous images, interpolation circuitry for mapping the result surface into x- and y-coordinates, and an interface with a device using the chip, such as a hand-held scanner.

The filter circuitry, the compression circuitry, the correlation circuitry and the interpolation circuitry are all embodied in an on-chip digital signal processor (DSP). The DSP embodiment allows precise algorithmic processing of the digitized signal with almost infinite hold time, depending on storage capability. The corresponding mathematical computations are thus no longer subject to the vagaries of CMOS chip structure processing analog signals. Parameters may also be programmed into the DSP's software making the chip tunable, as well as flexible and adaptable for different applications.

U.S. Pat. No. 5,644,139 to Allen et al discloses a scanning device and a method for forming a scanned electronic image including the use of navigation information that is acquired along with image data, and then rectifying the image data based upon the navigation and image information. The navigation information is obtained in frames. The differences between consecutive frames are detected and accumulated, and this accumulated displacement value is representative of a position of the scanning device relative to a reference. The image data is then positioned-tagged using the position data obtained from the accumulated displacement value. To avoid the accumulation of errors, the accumulated displacement value obtained from consecutive frames is updated by comparing a current frame with a much earlier frame stored in memory and using the resulting difference as the displacement from the earlier frame. These larger displacement steps are then accumulated to determine the relative position of the scanning device.

The above documents teach how to determine the position in a conceptual generation of navigation information. In this context the U.S. Pat. No. 5,927,872 to Yamada uses the navigation information for a hand-held scanner disclosed in U.S. Pat. No. 5,644,139 to Allen et al. The invention according to Allen et al teaches navigation through comparison of pixels on a frame basis.

When printing lines/rows of text or images with, for example, a hand held printer of a type described through the Swedish patent application 0102542-3 by Walling, not yet published but described below, there are problems related to skew between successive lines/rows, when the print-head is moved back and forth from the right to the left downwards on a print medium such as a piece of paper. The printing operation builds up an image of horizontal bands in lines where a lower band is an extension of an upper band. Hereby, sensor means for positioning sensing of the print-head are providing the printer with information so that positions and an angle of rotation can be determined on the print medium used. This must be accomplished very accurate in order to avoid skewing and/or clipping of, for example, printed characters.

Hence, if the absolute position and/or angle of rotation do not correspond with the values input to the printer, due to, i.a., the system resolution, the bands of text would not fit to each other. Obvious consequences of band skew are clipping/cutting of characters to be printed, depicted as a part of, for example, a character being printed in an upper band and the remaining part in a lower band in sweeps with the printer, and the character or word printed becomes hard to interpret, i.e., readability is distorted.

Regarding the resolution of a positioning sensor, currently used sensors have been shown to transfer mal positioning within 0.5–1.0%. In order to avoid distortion, current sensor resolution has to be improved with a factor 10.

SUMMARY OF THE DISCLOSED INVENTION

The present invention relates to a new print-head assembly for a hand-held and hand-operated printing on a print medium controlled by a processor. To solve problems mentioned in the latter part of the background description, the assembly is provided an arrangement and a method for preventing skew and cutting of printed text or other images.

Hence, the present invention sets forth a sensor and print-head assembly comprised in a housing for a hand-held and hand-operated printing device controlled by a processor, comprising at least one sensor means, a print-head array, input means on said housing connected to said processor for input of assembly control commands, and means for keeping track of the assemblies and print-heads position on a print medium. It thus, for a print out sweep with said array, comprises:

means for determining the x and y coordinates for at least one distal end of at least one row of printing means in said print head array, and the angle of rotation of said row with reference to a base line, made up of coordinates for the long side of an image stored to be printed, whereby every dot of a part of an image to be printed having determinable corresponding x and y coordinates related to a determined position for said row;

means for determining an x and y coordinate for a first tangent of said row with the first part of said image to be printed, and at least one second tangent for said image in relation to a mathematically defined configuration relating to the rotation angle of the row and said distal end, said second tangent making up a boundary for when a print out of said part image should take place;

means for determining if said row during movement is closing in to said second tangent from the clockwise or counter clockwise direction; and means for providing a print out decision for a subsequent part image to be printed through said print-head in front of a print out, if the row is closing in clockwise to the second tangent when using the upper distal end of the row as reference for the second tangent (84), and the vice versa when using the lower distal end as reference for a sweep.

In one embodiment of the present invention, the print-head is of the ink-jet type with spray nozzles making up said row. A further embodiment comprises that the first and last nozzle in said row are references for said distal ends.

A still further embodiment provides that the mathematical configuration has one origin on at least one of the distal ends of said row. Another embodiment provides that the configuration is used for clockwise rotation and/or counter clockwise rotational print out feeding through said row.

A yet further embodiment comprises that said mathematical configuration is a line suitable for forward feeding with less rotation of said array. In another embodiment said mathematical configuration is a curve suitable for rotation feeding of said array.

Yet another embodiment provides a frame that is related to each part image to be printed, thus defining every part image through at most four tangent coordinates for said first and said second tangent. In a further embodiment coordinates for a frame are stored in a table sorted in accordance with corresponding part images to be printed. In one embodiment said frame is longer then the actual part image to be printed, whereby a next image to be printed is pre-checked according to its alignment for printing.

Yet one further embodiment provides that said array row is approximated with at least one half of a rectangle, thus facilitating the finding of a tangent for said row for a part image to be printed.

The present invention also presents a method for a sensor and print-head assembly comprised in a housing for a handheld and hand operated printing device controlled by a processor, comprising at least one sensor means for keeping track of the assemblies and print-heads position on a print medium and a print-head array. The method thus comprises, during a print out sweep with said array, the steps of:

determining the position of the array at each moment;

predicting the positions of the array for subsequent moments in order to determine whether a text block or an image is about to be printed during said subsequent moments and if so deciding whether the complete text block or image, or a predefined part of the text block or the image will be covered by said array during said print out sweep, based on said predictions, and if not, omitting a print out of said text block or image, or said part of the text block or image during said print out sweep, otherwise printing out said text block or image during said print out sweep.

Moreover the present invention presents a method for a sensor and print-head assembly comprised in a housing for a hand-held and hand-operated printing device controlled by a processor. It comprises at least one sensor means, a print-head array, input means on said housing connected to said processor for input of assembly control commands, and means for keeping track of the assemblies and print-heads position on a print medium.

During a print out sweep with said array, it performs the steps of:

determining the x and y coordinates for at least one distal end of at least one row of printing means in said print head array, and the angle of rotation of said row with reference to a base line, made up of coordinates for the long side of an image stored to be printed, whereby every dot of a part of an image to be printed having determinable corresponding x and y coordinates related to a determined position for said row;

determining an x and y coordinate for a first tangent of said low with the first part of said image to be printed, and at least one second tangent for said image in relation to a mathematically defined configuration relating to the rotation angle of the row and said distal end, said second tangent making up a boundary for when a print out of said part image should take place;

determining if said row during movement is closing in to said second tangent from the clockwise or counter clockwise direction; and said print-head accomplishing a print out of said part of an image as long as the row is closing in clockwise to the second tangent when using the upper distal end of the row as reference for the second tangent, and the vice versa when using the lower distal end as reference for a sweep.

It is appreciated that the methods of the present invention is able to perform steps addressed through the above assembly embodiments, as addressed through the attached set of method sub claims.

BRIEF DESCRIPTION OF THE DRAWINGS

Henceforth reference is had to the accompanying drawings for a better understanding of the given examples and embodiments of the present invention, wherein.

DETAILED DESCRIPTION OF PREFERRED EMBODIMENTS

As mentioned in the foregoing, the present invention relates to a new print-head assembly for a hand-held and hand-operated printing on a print medium controlled by a processor. To solve problems relating to skew and/or clipping of images during consecutive sweeps with a RMPT printer, the assembly is provided an arrangement and a method for preventing skew and cutting of printed text.

A detailed description of the arrangement and method in accordance with the present invention is provided with reference to FIG. 11 to FIG. 14 below.

FIG. 1 to FIG. 10 disclose or relate to a hand-held printer device as described in the Swedish patent application 0102542-3 by Walling, not yet published, which substitutes both the mechanical control of a print-head and forward feeding of a print-out through hand movements on a printing surface. This enables a manufacturing of a printer device, having less width than the actual print-out, and a reduction of the total of mechanical components in its construction.

It is designed to provide a compact portable printing device in order to enable a user to print from small portable devices such as a cellular phone, a portable PC, a personal digital assistance (PDA) or the like, and other portable electronic devices or for electronic stamping, printing of small texts, tags, addresses, cutting and clipping.

By fixing a print-head in a construction plate where one or more positioning sensor means are fixed as well, it is possible to obtain a geometrical construction with an x- and y-coordinate system and to establish, with great mathematical accuracy, the coordinates x and y for each individual ink-jet opening/nozzle in the print-head.

The coordinates, during a time frame, constitute the grounds for an accurate and precise spraying of ink-drops onto a printing surface according to a predetermined printing design. Even when the coordinates change over a time period it is possible to calculate in real time, the changes in direction, speed, acceleration, rotation etc. along the z-axis controlled by a microprocessor. It provides the possibility to adjust the printing-head to spray an even and pre-programmed flow of ink-jet drops into an adjustable and varying flow of ink-jet drops.

Figure 1:
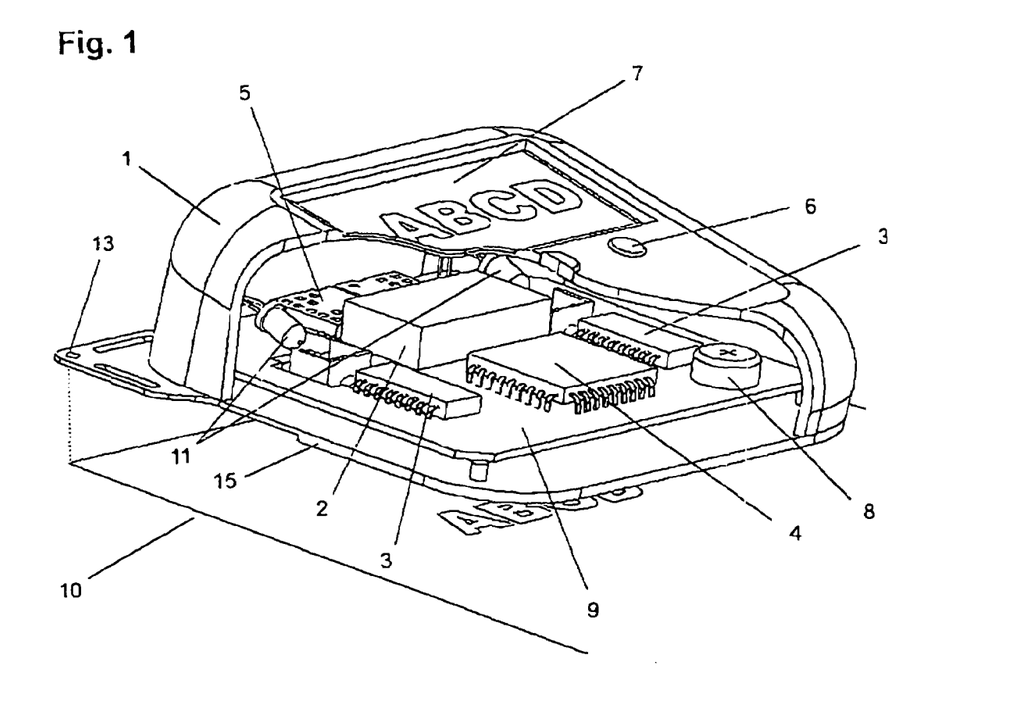
FIG. 1 illustrates a perspective view in section of a printing device that may be used in the present invention.
Figure 2:
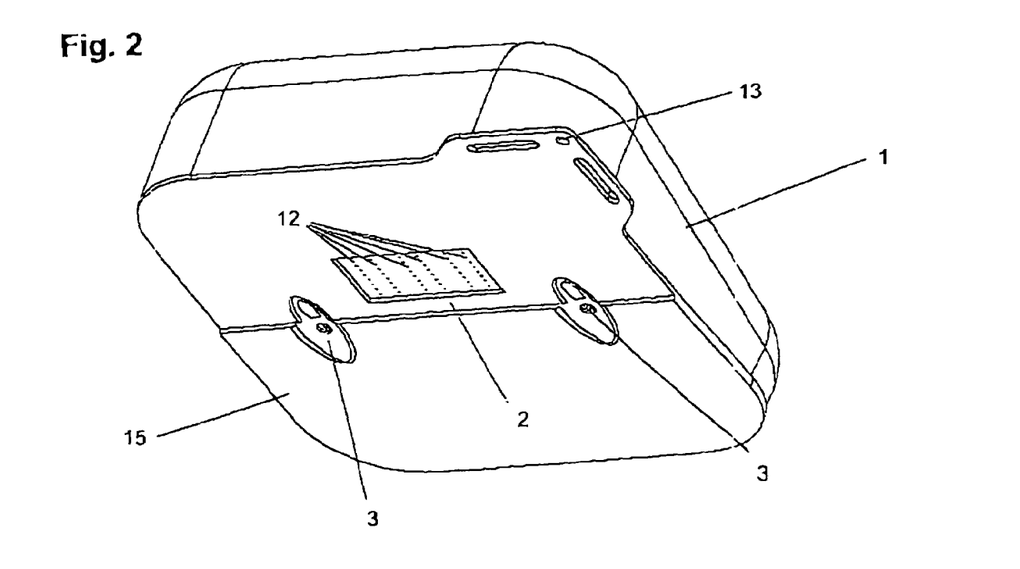
FIG. 2 illustrates a perspective view from underneath of a printing device according to FIG. 1.

FIGS. 1 and 2 illustrate a hand operated printing device composed by a construction/design body 1 and a print-head 2 which interact with one or more optical positioning sensor means 3, a micro controller circuit 4, a communication unit 5 to transmit the data, one or more command buttons 6 a control screen, and a source of energy, in this case a battery 8.

The embodiment according to FIGS. 1 and 2 illustrate the different components of a printing device fixed to a printed circuit card which simultaneously functions as a construction surface where those components are fixed. An elevation in the construction secures that the lowest surface of the printing device does not touch the area where the ink has been previously applied provided that the printing device is removed from that area.

The printing process starts with a data file containing pre-selected printing patterns, which are sent via the communication unit 5 to a data memory, for example, one which is built into the micro controller circuit 4. With the assistance of a built-in positioning sensor means 13 and one of the command buttons 6 the coordinates are indicated to an outgoing point of reference in the printing surface. One or more sources of light, for example light emitting diodes (LED), lighting up the printing frame so that the optical positioning sensor means are activated and then the forward feeding of the coordinates to the micro controller circuit can take place.

When the positioning sensor means 3 and the print-head 2 are fixed in relation to each other, a geometrical construction with all the necessary parameters for a mathematical calculation of the coordinates of the print-head 2 can be achieved.

The micro controller circuit 4 contains a software program, which uses the incoming data from the positioning sensor means 3 and mathematical equations to calculate in real time the coordinates for each individual ink-jet nozzle 12.

Using the measures of two coordinates establishes the required movement direction for each case. The time difference between two measurements indicates the acceleration and speed required. Simultaneously all measurements and equations are compared with the stored printing commands based upon coordinates equated from the original data file.

At this stage the micro controller circuit has sufficient information to seize a decision. On a positive indication an electric impulse is generated in the piezo- or termo-electrical micro pumps in the concerned ink-jet nozzles 12, which in turn sends out ink-jet drops onto the printing surface.

The printing commands are erased after each electric impulse so that even if the ink-jet nozzles coincide with the previous coordinates no ink drops are sent out to the existing print out.

Figure 3:
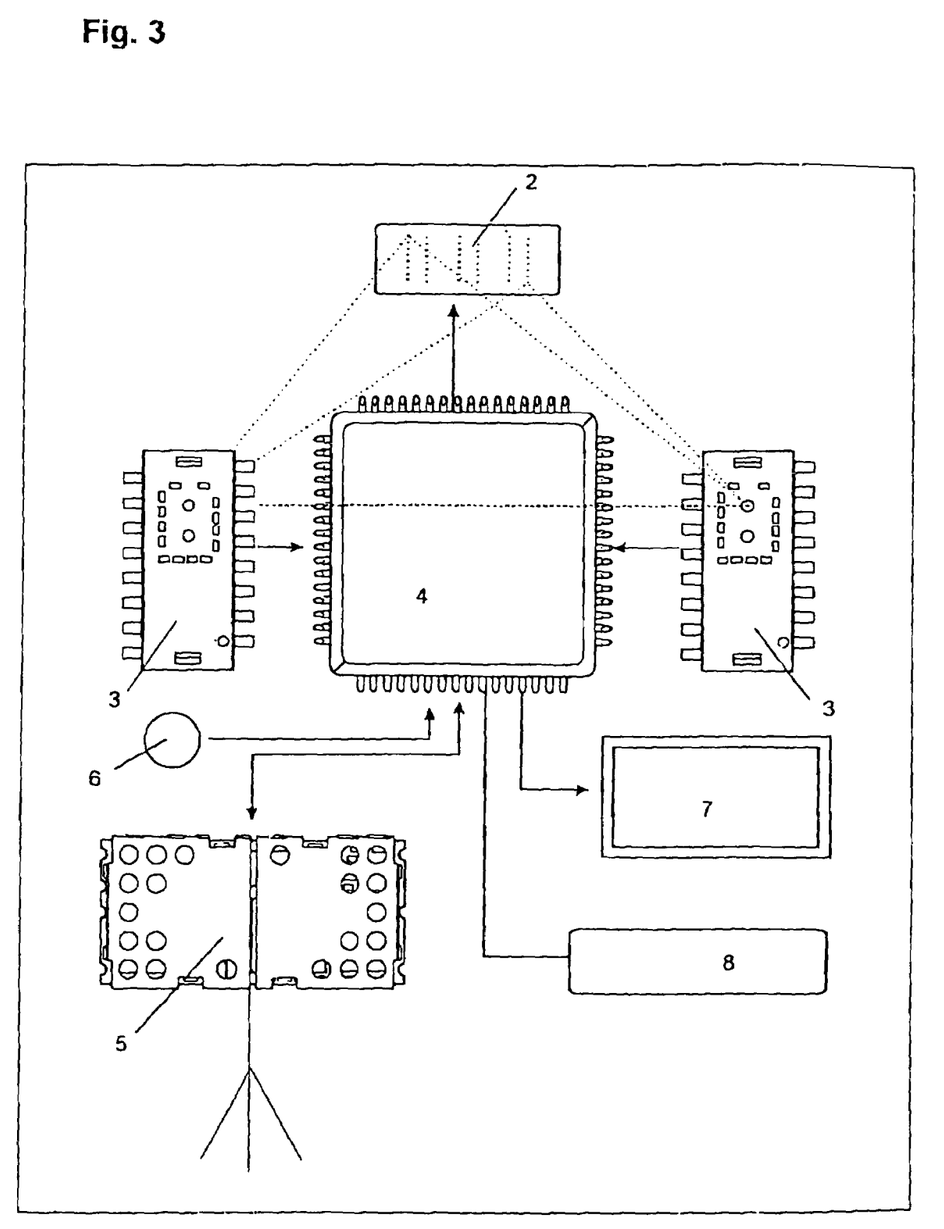
FIG. 3 illustrates a schematic view of the main components of a printing device according to FIGS. 1 and 2.

FIG. 3 illustrates how the different components of the printing device interact as well as reproduction of the geometrical forms established between the ink-jet nozzles 12 and the positioning sensor means 3.

Figure 4:
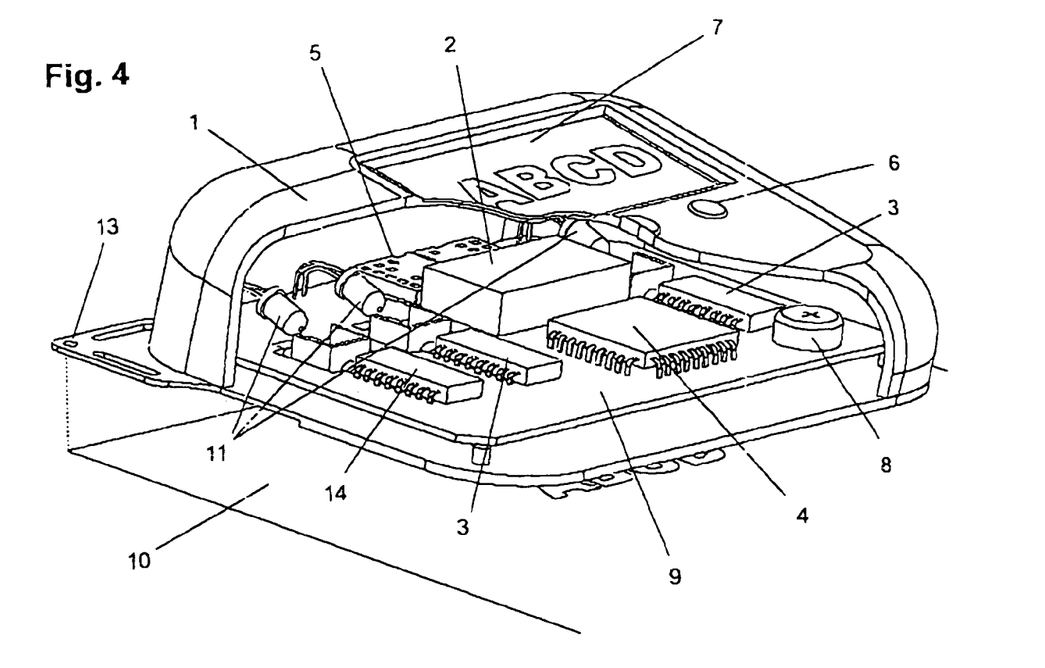
FIG. 4 illustrates a perspective view of another embodiment for a printing device that may be used in the present invention.

The embodiment according to FIG. 4 illustrates the printing device with a complementary digital camera 14, for example, such as a CCD equipped camera.

The print-head 2 can be pre-programmed to send out, with even intervals small groups of separated microscopic ink-jet drops pairs, which do not belong to the actual printing pattern but which can build a recognizable pattern for the camera 14. The camera registers these dots and transmits the information onto the micro controller circuit 4 which uses the information as a reference for ongoing revision of the position of the printing device and in that way reduce the effect of the margin of error built-in the positioning sensor means 3. This embodiment is especially effective when printing on bigger surfaces as well as when the resolution and quality demands are high.

These groups of microscopic ink-drops are essentially invisible for the human eye and they do not affect the printing result in any noticeable way.

Figure 5:
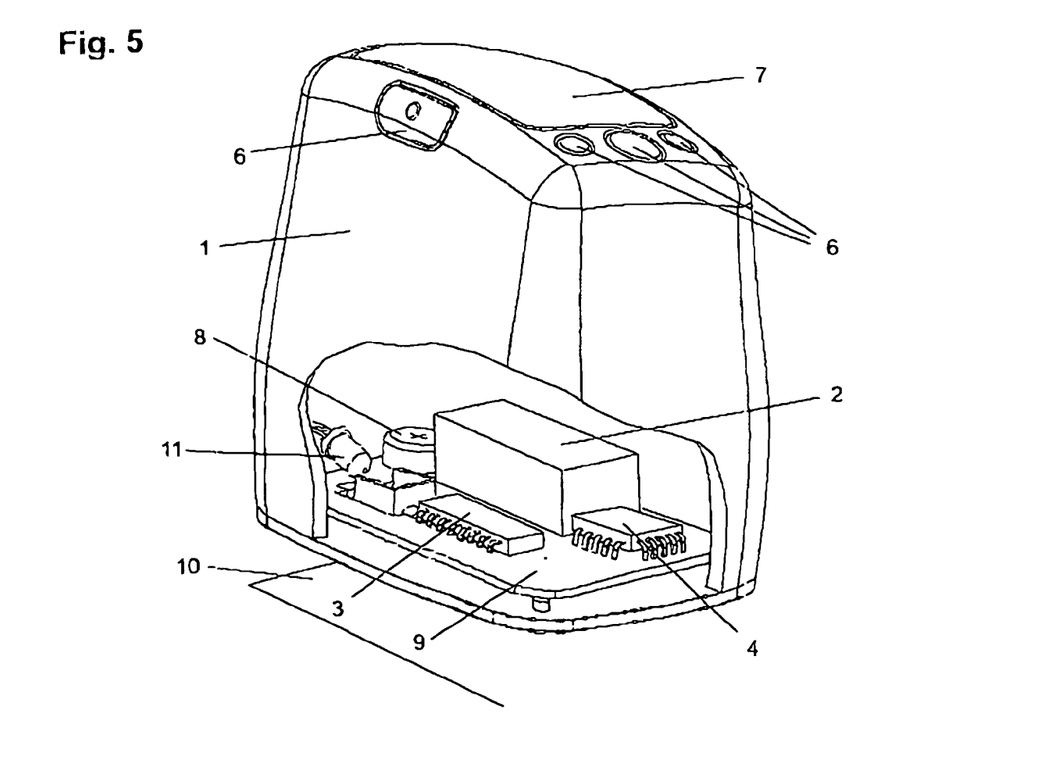
FIG. 5 illustrates a perspective view of a simpler printing device that may be used in the present invention.

FIG. 5 illustrates another embodiment for printing of smaller text quantities or graphics.

This can be considered as an electronic labeling with a pre-programmed and/or programmable electronic stamp pad.

In this embodiment only one positioning sensor means 3 is used and accordingly a simpler microcontroller circuit 4 is needed, since the printing device only makes smaller and relatively straight movements.

Figure 6:
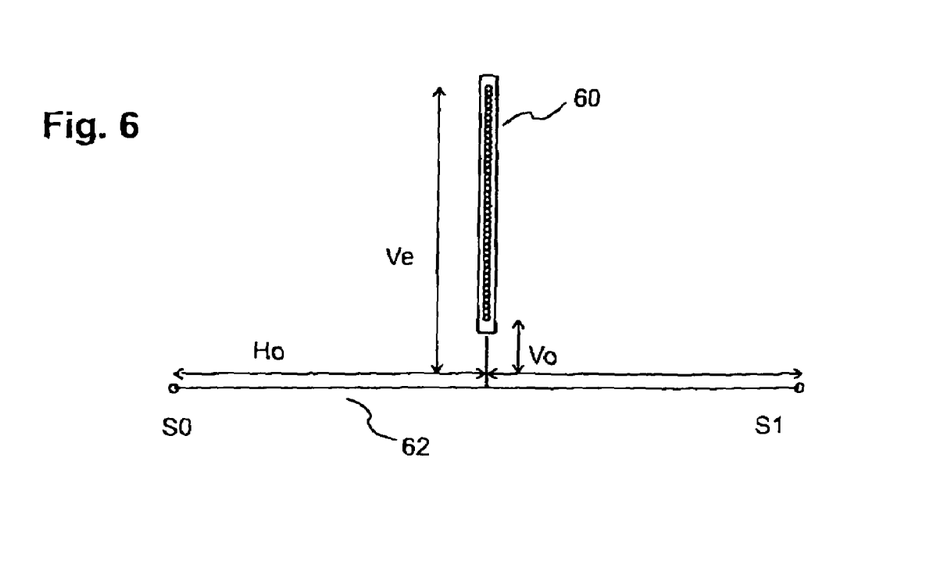
FIG. 6 schematically illustrates a sensor/print-head assembly that may be used in the present invention.

The sensor/print-head device consists of two position sensor means S0, S1 and a print head array 60 mounted together as FIG. 6 illustrates. FIG. 6 illustrates further, the two sensor means S0 and S1 in a fixed relation to a print-head array 60 with ink-jet nozzles. Ho depicts the distance from the array 60 to the sensor means S0, here Ho constitutes the same distance to the sensor means S1. Ve and Vo, indicate the distance to the upper most and the lover nozzle in the array 60, respectively. The sensor means S0, S1 provide a signal corresponding to movements in x- and y-directions in a first coordinate system fixed to the respective sensor means S0, S1. The sensor means S0, S1 are fixed so that their coordinate systems are parallel to each other. A software keeps track of the assembly's position and angle relative to the paper coordinate system by integrating the movements given by the sensor means signals.

The new positions given the differential movements of sensor means S0, S1 are calculated as follows.

All position changes given in the sensor means coordinate system must be transformed to position and angle of the sensor system in a paper or other print medium coordinate system, here named as a second coordinate system. Since the distance, 2Ho, between the two sensor means is fixed it is satisfactory to know the position of one sensor means and the angle of the print head array relative to the second coordinate system.

Figure 7:
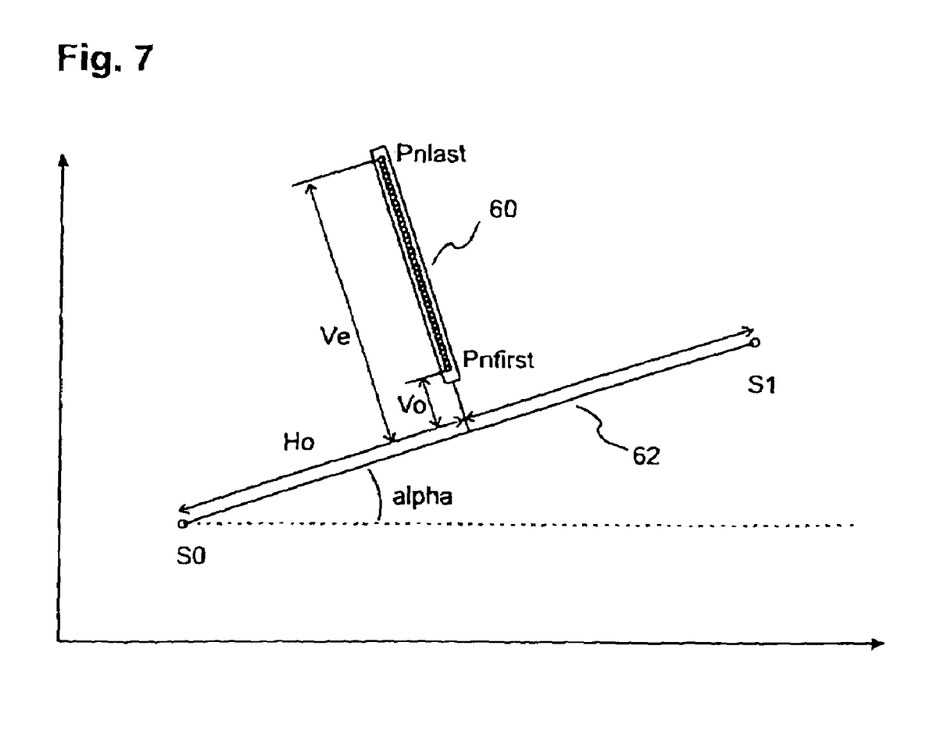
FIG. 7 illustrates a diagram with parameters used to determine the position of a sensor that may be used in the present invention.

Illustrated in FIG. 7, is a movement or navigation of the sensor print-head assembly according to FIG. 6. The array 60 has been moved or navigated an angle alpha. The upper most nozzle is depicted as Pnlast and the lower nozzle as Pnfirst, respectively, in FIG. 7. Also, the second coordinate system is depicted with the two longer arrow axis in FIG. 7.

In FIG. 7 at least one of the sensor means is assigned a first coordinate system, whereby one axis 62, preferably the x-axis, is directed through both sensor means S0, S1, and the other axis, preferably in a relation to the array 60, here in parallel to the array.

Figure 8:
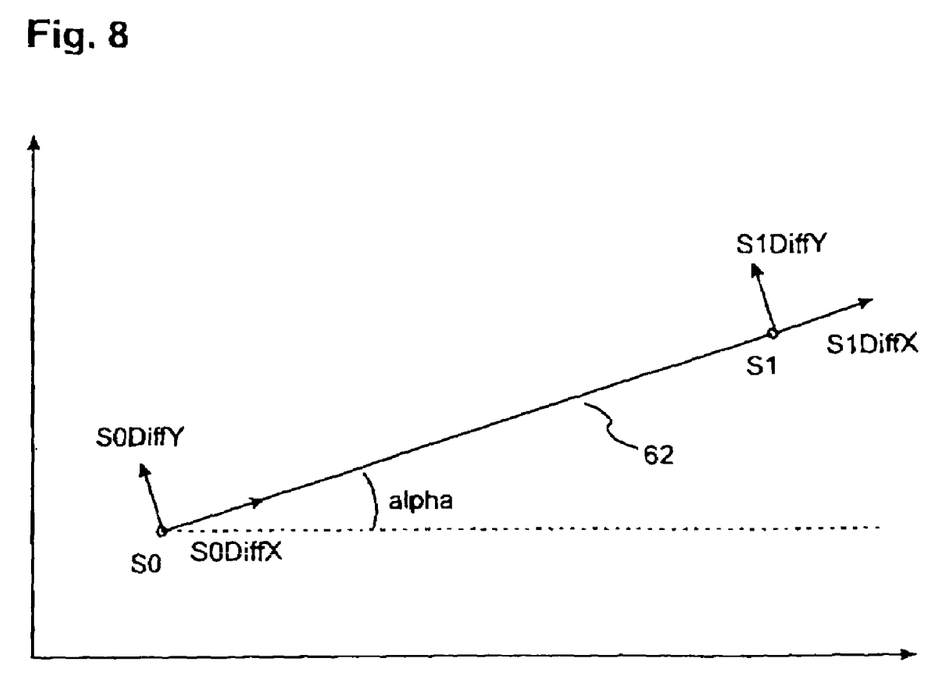
FIG. 8 illustrates a diagram with parameters for a print-head nozzle position.

In FIG. 8, the same movement as in FIG. 7 is depicted, but without the array 60. The FIG. 8 further depicts a first coordinate system on the coordinate axis 60 directed through both sensor means S0, S1. The first coordinate system, is in this embodiment duplicated, as indicated through the arrows on the axis 62, but as the distance between both sensor means S0, S1 is fixed only one of the first coordinate systems is needed for computation.

The movement of the sensor means S0 or S1 (it does not matter which one) in the paper or print medium second coordinate system at an angle 'alpha' is calculated, as:

$$\text{delta}X = S0\text{Diff}X \ast \cos(\text{alpha}) - S0\text{Diff}Y \ast \sin(\text{alpha})$$

$$\text{delta}Y = S0\text{Diff}X \ast \sin(\text{alpha}) + S0\text{Diff}Y \ast \cos(\text{alpha})$$

Where S0DiffX and S0DiffY are the movements of the sensor means in x- and y-directions respectively, in the sensor/print-head device, named first coordinate system.

The angular change can be calculated as the difference of the sensor means y-movements in the sensor means first coordinate system multiplied by a constant that is determined from the distance between the sensor means S0, S1. To simplify, the angle is measured in units of one sensor "step" and the sine and cosine values are taken from tables that are adjusted according to this. Thus S1DiffY-S0DiffY, provides the angle change.

The movement in x-direction of sensor means S1 is not used, the information is redundant since the sensor means geometry is fixed.

When the position of one sensor means S0 or S1 and the tilt angle of the sensor/print head assembly alpha are known the positions of the print head nozzles can be calculated as follows, depicted in FIG. 7:

The positions of the first and last nozzle are calculated as:

$$PN\text{first}X = S0x + Ho \ast \cos(\text{alpha}) - Vo \ast \sin(\text{alpha})$$

$$PN\text{first}Y = S0y + Ho \ast \sin(\text{alpha}) + Vo \ast \cos(\text{alpha})$$

$$PN\text{last}X = S0x + Ho \ast \cos(\text{alpha}) - Ve \ast \sin(\text{alpha})$$

$$PN\text{last}Y = S0y + Ho \ast \sin(\text{alpha}) + Ve \ast \cos(\text{alpha})$$

To calculate the positions of all nozzles, it is to start with the first nozzle positions and adding up the difference in x- and y-directions between the nozzles, calculated by dividing the x- and y-distance between the first and last nozzle by the number of nozzles:

$$PN(n)X = PN\text{first}X + n \ast \text{delta}X$$

$$PN(n)Y = PN\text{last} - n \ast \text{delta}Y$$

where $$\text{delta}X = PN\text{last}X - PN\text{first}Y$$

$$\text{delta}Y = PN\text{last}Y - Pn\text{first}Y$$

In accordance with the teaching it sets forth a sensor and ink-jet print-head 2 assembly comprised in a housing 1 for a hand-held and hand-operated printing device controlled by a processor 4. It thus comprises:

two position sensor means S0, S1 at least one sensor means being related to a first coordinate system, having one axis in a relation to the print-head assembly, and one axis 62 in a direction through both sensor means;

a print-head array 60 attached in a fixed position to the sensor means S0, S1;

input means 6 on the housing connected to the processor for input of control commands;

determining means for reference coordinates in a second coordinate system provided in relation to a print medium, the reference coordinates being established by a control command through the input means 6 with the thus read sensor means signals, integrating means for keeping track of the assemblies position related to the reference coordinates in the second coordinate system by integrating displacement of the sensor means position in the first coordinate system;

computing means for transforming the sensor means S0, S1 coordinates to coordinates in the second coordinate system, whereby the assemblies position on the print medium is determined in relation to the reference coordinates.

Sensor means and print-heads that are suitable to use are well known in the art and described in for example U.S. Pat. No. 5,927,872 to Yamada, U.S. Pat. No. 6,233,368 B1 to Badyal et al, and U.S. Pat. No. 5,644,139 to Allen et al. Sensor means can be bought from Agilent, www.agilent.com. Another sensor means has the product name HDNS-2000 and enables 1.500 pictures/s, the next model in progress enables 6.000 pictures/s. Sensor means in this description can comprise known means that are to cooperate together with a sensor itself, for example, LEDs or only be sensors or an array of sensors.

Figure 9:
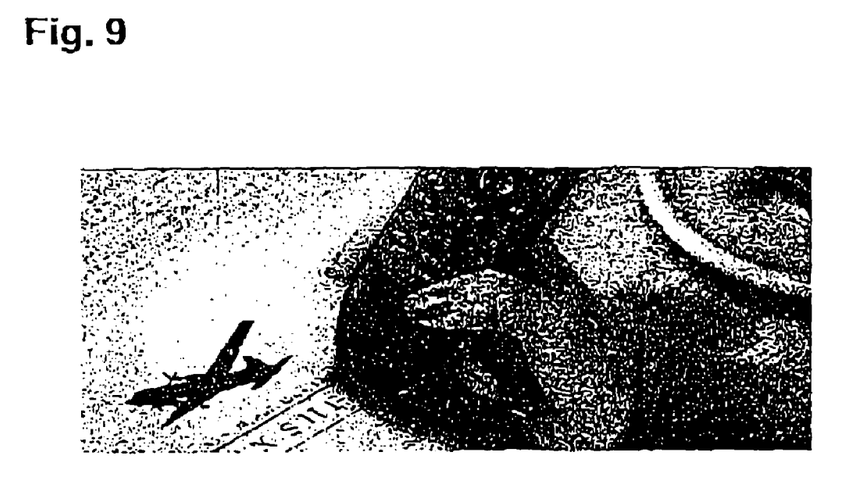
FIG. 9 illustrates an image to be print out.
Figure 10:
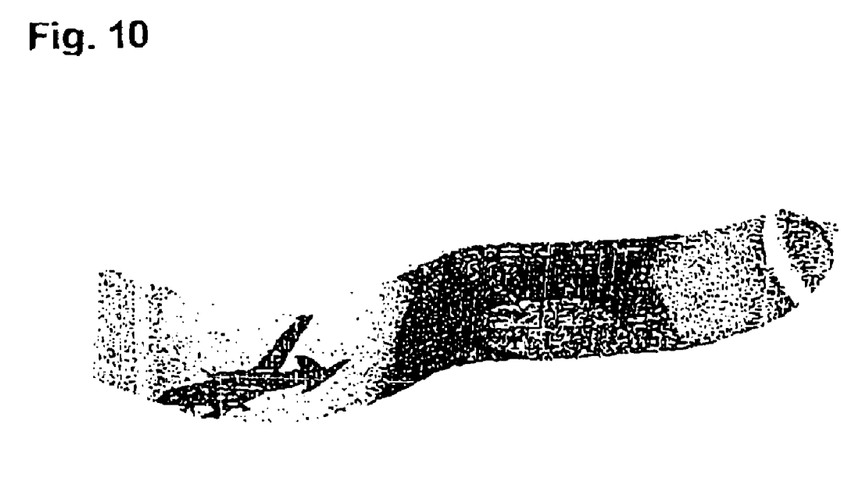
FIG. 10 illustrates a part random print out of the image with a printer of, for example, FIG. 1.

FIG. 9 illustrates an image to be print out with the assembly, thus stored in the assembly's memory, and FIG. 10 depicts a part print out in a random movement.

Figure 11:
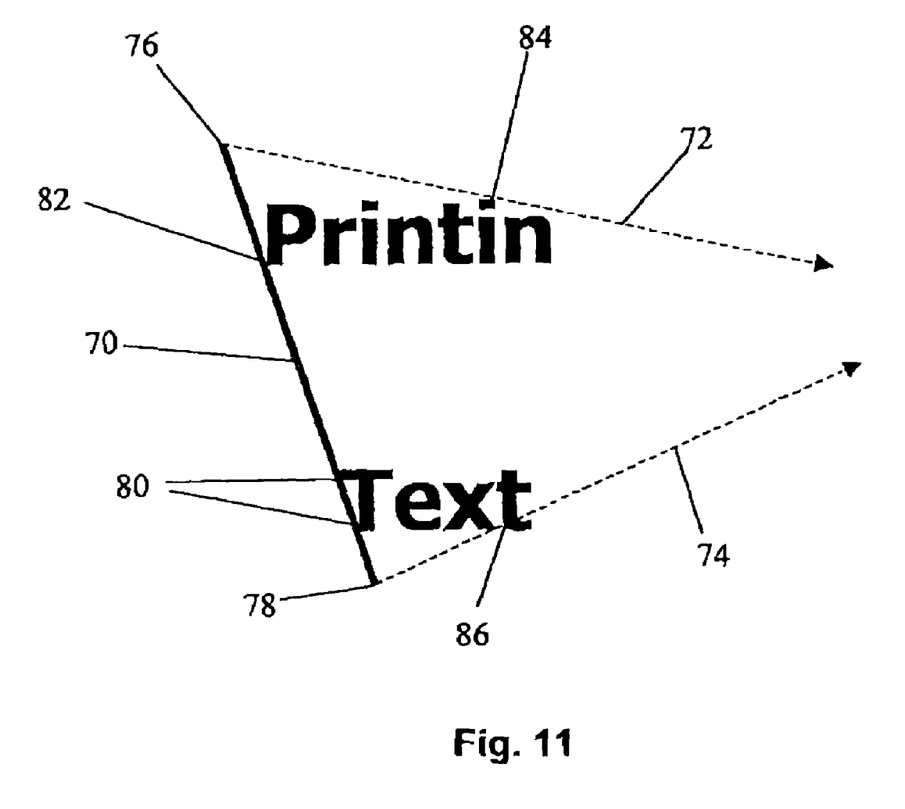
FIG. 11 illustrates a row in a print-head array in accordance with one embodiment of the present invention.

Now with reference to FIG. 11, when printing lines/rows of text or images with, for example, a hand held printer of the type described in the foregoing, there are problems related to skew between successive lines/rows, when the print-head is moved back and forth from the right to the left downwards on a print medium such as a piece of paper. The printing operation builds up an image of horizontal bands in lines where a lower band is an extension of an upper band, one band can comprise multiple lines of text, see FIG. 11, having two lines, one comprising the text "Printin" and one "text". Hereby, sensor means for positioning sensing of the print-head are providing the printer with information so that positions and an angle of rotation can be determined on the print medium used. This must be accomplished very accurate in order to avoid skewing and/or clipping of, for example, printed characters.

Hence, if the absolute position and/or angle of rotation do not correspond with the values input to the printer, due to, i.a., the system resolution, the bands of text would not fit to each other. Obvious consequences of band skew are clipping/cutting of characters to be printed, depicted as a part of, for example, a character being printed in an upper band and the remaining part in a lower band in sweeps with the printer, and the character or word printed becomes hard to interpret, i.e., readability is distorted.

Regarding the resolution of a positioning sensor, currently used sensors have been shown to transfer mal positioning within 0.5–1.0%. In order to avoid distortion, current sensor resolution has to be improved with a factor 10.

FIG. 11 illustrates a row 70 in a print-head array in accordance with one embodiment of the present invention. A user of the print-head assembly of the present invention is of course aware of to a certain degree, or indicated, how much the assembly is tilted in relation to a base line. But nevertheless the user can slip or prefer to rotate the assembly instead of sweeping forward in smooth continuous steps.

The RMPT printer relies on that the print-head is firmly attached in the assembly, and a printing operation or a print out is accomplished so that a user moves the printer on the print medium, successively building up the image to be printed. There are three degrees of freedom when moving the printer:
1. x-axis wise (right/left)
2. y-axis wise (up/down)
3. rotating The angle of the printer array row 70 is 0° when its printing line (here the same as row 70) is parallel with the long side (base line) of an image to be printed, stored in a memory of the assembly. For the embodiments described herein an ink-jet print-head, having spray nozzles is provided, but other print-heads are possible to use when implementing the present invention. More specifically, the print-head array is comprised of a row 70 of 128 nozzles, and uses sensors in accordance with the foregoing description.

The sensors S0, S1 presently used provide pulse trains as output signals, where each pulse reassembles a movement of the row 70 of approximately 1/400 inch. In one embodiment of the invention the assembly print-head prints out images of the bmp (bitmap) type, and the images are comprised of pure text, graphics, or a combination of both. But other versions of the assembly are likely to provide serial interfaces where a bulk of text arrives as characters to the printer.

The inkjet nozzle row 70 with distal ends 76 and 78 in FIG. 11 is depicted with two dotted arrow lines 72 and 74, indicating a tangent 84 through line 72 on an image "Printin" to be printed. Contrary to line 72, line 74 indicates an unwanted situation, where an image "Text" will be cut or clipped at point 86 if a print out is decided to occur, if the printer with row 70 is moved in a direction coinciding with the normal of row 70, a rotation clockwise would cut or clip the image "Print", and a counter wise rotation the image "Text".

To solve the problem of clipping and cutting images due to skew or tilting of the row 70, the present invention provides, during a print out sweep with the array/row 70, means for determining the x and y coordinates for at least one distal end 76, 78 of at least one row 70 of printing means in the print head array. Further determining the angle of rotation of the row 70 with reference to a base line or long side of an image, stored, to be printed. Every dot, pixel, of a part of an image ("Printin", "Text") to be printed does have a determinable corresponding x and y coordinate related to a determined position for the row 70, as for example described above.

Furthermore the present invention provides means for determining an x and y coordinate for a first tangent 80, 82 of the row 70 with the first part ("P" and "T" in FIG. 11) of the image to be printed, and a second tangent 84 for the image in relation to a mathematically defined configuration (the line 72 or 74 in FIG. 11) relating to the rotation angle of the row 70 and the distal end 76 whereby the print-head accomplishes a print out of the part ("Printin") of an image as long as the prolongation, following the arrow of line 72, of the second tangent 84 bypasses the part of an image during a sweep. A sweep of the assembly should be read as a continuous forward movement or rotation.

To be able to a correct decision for a print out of a part image, the present invention is able to determine if the row 70 during movement is closing in to the second tangent 84 from the clockwise or counter clockwise direction. The print-head 60 is according to this accomplishing a print out of the part of an image as long as the row 70 is closing in clockwise to the second tangent 84 when using the upper distal end 76 of the row 70 as reference for the second tangent 84, and the vice versa when using the lower distal end 78 as reference for a sweep.

One possible embodiment of the present invention may incorporate that both distal ends 76, 78 are used through a mathematical configuration 72, 74, which would provide that a print out would occur as long both clockwise and the counter clockwise directions are closing in to a second tangent 84 not crossing an image to be printed.

A decision of whether a part of an image should be printed has to be taken on line exactly before the image may be printed. Hence, the present invention sets forth means for providing a print out decision for a subsequent part image to be printed through the print-head 60 in front of a print out, if the row 70 is closing in clockwise to the second tangent 84 when using the upper distal end 76 of the row 78 as reference for the second tangent S4, and the vice versa when using the lower distal end 79 as reference for a sweep. In order to describe how to find a direction to move the printer assembly for a successful print out a less mathematical description follows:

If some part of a first character (P) in a word lies close to 82 the print line or row 70, and if the direction is less downwards than a fictive line 72 commencing from the upper part 76 of the print-head array row 70 rotated clockwise until a part 84 of the line touches the word to be printed, then print out.

During a movement to the left in FIG. 11, the problem becomes inverted. The above prevails under the condition that a movement is not changed during the time a word is printed. It is also possible to take curved movements into consideration instead of the line 72, 74 solution above.

In order to provide that the assembly of the present invention can operate as described, a great deal of "heavy" calculations have to be performed, for example, trigonometric calculations. Hence, the present invention presents a simpler solution to the addressed problem, but still within the scope of the invention as defined in the attached main claims.

Figure 12:
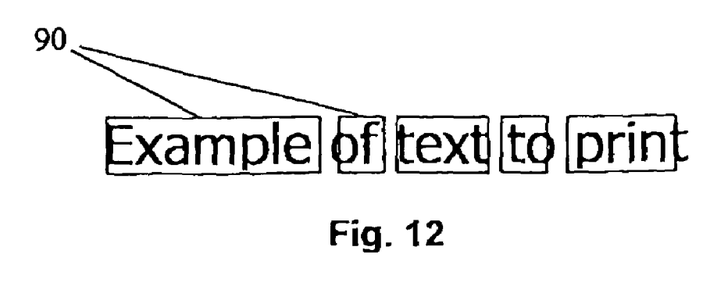
FIG. 12 illustrates images that are framed in accordance with one embodiment of the present invention.

Instead of checking how every part image to be printed is build up, the present invention suggests to put a frame 90 around each part image, as depicted in FIG. 12, which illustrates images that are framed in accordance with one embodiment of the present invention. Part images to be printed in accordance with FIG. 12 are the following "Example", "of", "text", "to", and "print". It is appreciated that various other framings are possible for a person skilled in the art. Those in FIG. 12 are to be regarded as possible examples.

By determining the coordinates for the corners of the frames and store them in a look up table in an electronic memory, preferably arranged or sorted to consecutively correspond with the part images to be print out, the print out calculations are heavily reduced.

Figure 13:
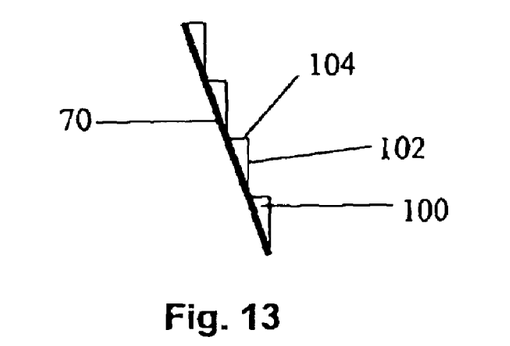
FIG. 13 illustrates a row in a print-head array, being allocated half's of rectangles in accordance with one embodiment of the present invention.

FIG. 13 illustrates another embodiment of simplifying calculations, where a row 70 in a print-head array, being allocated half's of rectangles 100 in accordance with one embodiment of the present invention. Hereby, the printer line or row 70 is approximated with a plurality of vertical lines 102 closed with horizontal lines 104 each "stair" making up a half of a rectangle 100 in shape. This approach simplifies the finding of a location where a part of an image tangents the row 70. The vertical lines 102 are in parallel (base line) with the image coordinates stored in the bitmap for the image in question.

Figure 14:
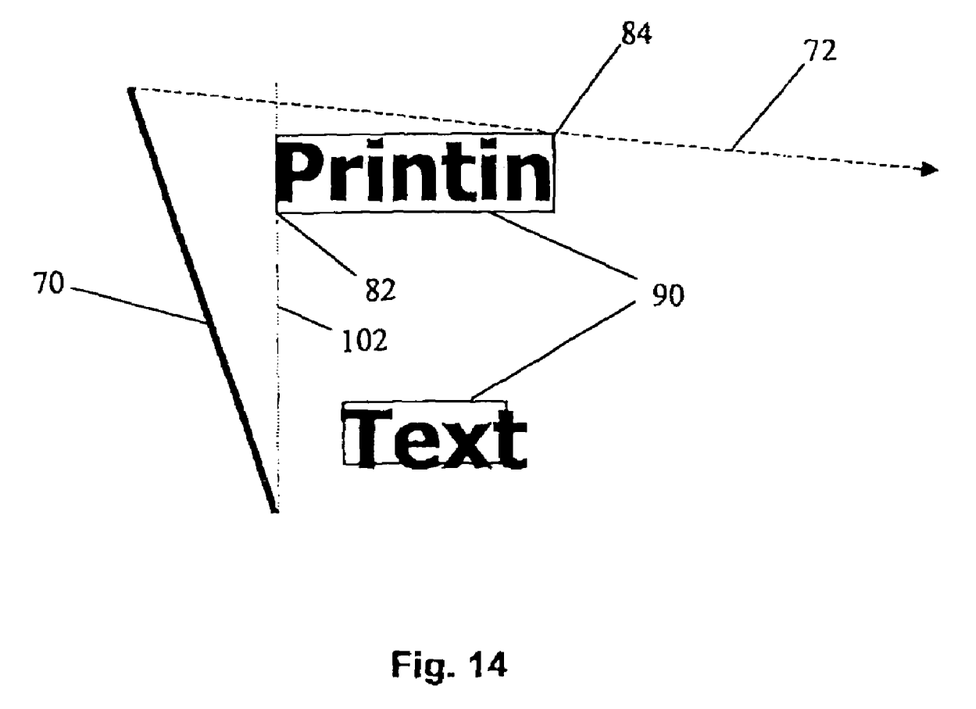
FIG. 14 illustrates a row in a print-head array, being allocated one half of a rectangle in accordance with one specific embodiment of the present invention.

FIG. 14 illustrates a row 70 in a print-head array, being allocated just one half of a rectangle in accordance with one specific simplified embodiment of the present invention. This represents an extreme case of a "stair" approximation, with just one vertical line 102 and framed images to be printed.

A less mathematical explanation of how the "stair" solution is operated is now provided:

If the print line or row 70 lower distal ends x coordinate is the same as for the frame left side x coordinate, and if the direction of the fictive line 72 originating from the upper distal end 76 is less downwards pointing then the upper right corner of the frame, then allow a print out.

Regarding frames in the context of the present invention they could preferably in one embodiment of the invention be made a predetermined length longer then a part image itself to be printed, thus providing a pre check of the alignment of the next part image to be printed.

It is appreciated that some of the means used in the present invention are hardware means or software means or a combination of both.

The present invention is not restricted to given embodiments or examples, but the attached set of claims define other embodiments for a person skilled in the art.

The invention claimed is:

1. A sensor and print-head assembly comprised in a housing for a hand-held and hand-operated printing device controlled by a processor, comprising at least one sensor means, a print-head array, input means on said housing connected to said processor for input of assembly control commands, and means for keeping track of the assemblies and print-heads position on a print medium, characterized in that it comprises for a print out sweep with said array:

means for determining the x and y coordinates for at least one distal end of at least one row of printing means in said print head array, and the angle of rotation of said row with reference to a base line, made up of coordinates for the long side of an image stored to be printed, whereby every dot of a part of an image to be printed having determinable corresponding x and y coordinates related to a determined position for said row;

means for determining an x and y coordinate for a first tangent of said row with the first part of said image to be printed, and at least one second tangent for said image in relation to a mathematically defined configuration relating to the rotation angle of the row and said distal end, said second tangent making up a boundary for when a print out of said part image should take place;

means for determining if said row during movement is closing in to said second tangent from the clockwise or counter clockwise direction;

means for providing a print out decision for a subsequent part image to be printed through said print-head in front of a print out, if the row is closing in clockwise to the second tangent when using the upper distal end of the row as reference for the second tangent, and the vice versa when using the lower distal end as reference for a sweep.

2. An assembly according to claim 1, wherein the print-head is of the ink-jet type with spray nozzles making up said row.

3. An assembly according to claim 2, wherein the first and last nozzle in said row are references for said distal ends.

4. An assembly according to claim 1, wherein said mathematical configuration has one origin on at least one of the distal ends of said row.

5. An assembly according to claim 1, wherein said configuration is used for clockwise rotation and/or counter clockwise rotational print out feeding through said row.

6. An assembly according to claim 1, wherein said mathematical configuration is a line suitable for forward feeding of said array.

7. An assembly according to claim 1, wherein said mathematical configuration is a curve suitable for rotation feeding of said array.

8. An assembly according to claim 1, wherein a frame is related to each part image to be printed, thus defining every part image through at most four tangent coordinates for a first and a second tangent.

9. An assembly according to claim 8, wherein coordinates for a frame are stored in a table sorted in accordance with corresponding part images to be printed.

10. An assembly according to claim 8, wherein said frame is longer then the actual part image to be printed, whereby a next image to be printed is pre checked according to its alignment for printing.

11. An assembly according to claim 1, wherein said array row is approximated with at least one half of a rectangle, thus facilitating the finding of a tangent for said row for a part image to be printed.

12. A method for a sensor and print-head assembly comprised in a housing for a handheld and hand operated printing device controlled by a processor, comprising at least one sensor means for keeping track of the assemblies and print-heads position on a print medium and a print-head array characterized in that it comprises, during a print out sweep with said array, the steps of:
   determining the position of the array at each moment;
   predicting the positions of the array for subsequent moments in order to
   determine whether a text block or an image is about to be printed during said subsequent moments and if so
   deciding whether the complete text block or image, or a predefined part of the text block or the image will be covered by said array during said print out sweep, based on said predictions, and if not,
   omitting a print out of said text block or image, or said part of the text block or image during said print out sweep, otherwise
   printing out said text block or image during said print out sweep.

13. A method for a sensor and print-head assembly comprised in a housing
   for a hand-held and hand-operated printing device controlled by a processor, comprising at least one sensor means, a print-head array, input means on said housing connected to said processor for input of assembly control commands, and means for keeping track of the assemblies and print-heads position on a print medium, characterized in that it comprises, during a print out sweep with said array, the steps of:
   determining the x and y coordinates for at least one distal end of at least one row of printing means in said print head array, and the angle of rotation of said row with reference to a base line, made up of coordinates for the long side of an image stored to be printed, whereby every dot of a part of an image to be printed having determinable corresponding x and y coordinates related to a determined position for said row;
   determining an x and y coordinate for a first tangent of said row with the first part of said image to be printed, and at least one second tangent (84) for said image in relation to a mathematically defined configuration relating to the rotation angle of the row and said distal end, said second tangent making up a boundary for when a print out of said part image should take place;
   determining if said row during movement is closing in to said second tangent from the clockwise or counter clockwise direction; and
   providing a print out decision for a subsequent part image to be printed through said print-head in front of a print out, if the row is closing in clockwise to the second tangent when using the upper distal end of the row as reference for reference for the second tangent, and the vice versa when using the lower distal end as reference for a sweep.

14. A method according to claim 13, wherein the print-head is of the ink-jet type with spray nozzles making up said row.

15. A method according to claim 14, wherein the first and last nozzle in said row are references for said distal ends.

16. A method according to claim 13, wherein said mathematical configuration has one origin on at least one of the distal ends of said row.

17. A method according to claim 13, wherein said configuration is used for clockwise rotation and/or counter clockwise rotational print out feeding through said row.

18. A method according to claim 13, wherein said mathematical configuration is a line suitable for forward feeding with less rotation of said array.

19. A method according to claim 13, wherein said mathematical configuration is a curve suitable for rotation feeding of said array.

20. A method according to claim 13, wherein a frame is related to each part image to be printed, thus defining every part image through at most four tangent coordinates for a first and a second tangent.

21. A method according to claim 20, wherein coordinates for a frame are stored in a table sorted in accordance with corresponding part images to be printed.

22. A method according to claim 20, wherein said frame is longer then the actual part image to be printed, whereby a next image to be printed is pre checked according to its alignment for printing.

23. A method according to claim 13, wherein said array row is approximated with at least one half of a rectangle, thus facilitating the finding of a tangent for said row for a part image to be printed.

* * * * *